US012580701B2

(12) United States Patent
Gu et al.

(10) Patent No.: US 12,580,701 B2
(45) Date of Patent: Mar. 17, 2026

(54) METHOD AND APPARATUS FOR TRANSMITTING AND RECEIVING SOUNDING REFERENCE SIGNAL

(71) Applicant: 1FINITY Inc., Kawasaki (JP)

(72) Inventors: Junrong Gu, Beijing (CN); Lei Zhang, Beijing (CN); Zhe Chen, Beijing (CN); Qinyan Jiang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 375 days.

(21) Appl. No.: 18/133,760

(22) Filed: Apr. 12, 2023

(65) Prior Publication Data

US 2023/0254080 A1 Aug. 10, 2023

Related U.S. Application Data

(63) Continuation of application No. PCT/CN2020/121083, filed on Oct. 15, 2020.

(51) Int. Cl.
*H04L 5/00* (2006.01)

(52) U.S. Cl.
CPC ................................. *H04L 5/0048* (2013.01)

(58) Field of Classification Search
CPC ...................................................... H04L 5/0048
See application file for complete search history.

(56) References Cited

U.S. PATENT DOCUMENTS

2018/0332544 A1* 11/2018 Chakraborty ..... H04W 52/0283
2019/0174466 A1* 6/2019 Zhang ................... H04L 5/0057

2019/0356445 A1* 11/2019 Manolakos .......... H04B 7/0805
2020/0052853 A1 2/2020 Qin et al.
2020/0204316 A1 6/2020 Zhang et al.
2020/0382250 A1 12/2020 Choi et al.
(Continued)

FOREIGN PATENT DOCUMENTS

CN 108768599 A 11/2018
CN 109600794 A 4/2019
(Continued)

OTHER PUBLICATIONS

Notifice of Reasons for Refusal issued by the Japan Patent Office for corresponding Japanese Patent Application No. 2023-521953, mailed on Jan. 16, 2024, with an English translation.
(Continued)

*Primary Examiner* — Duc C Ho
(74) *Attorney, Agent, or Firm* — Myers Wolin, LLC

(57) ABSTRACT

Embodiments of the present application provide a method and an apparatus for transmitting and receiving a sounding reference signal, the transmitting method including: receiving, by a terminal equipment, configuration information of one or more sounding reference signals used for antenna switching transmitted by a network device; and transmitting, by the terminal equipment, transmit a sounding reference signal to the network device according to the configuration information by using one or more sounding reference signal resources, wherein a guard period is configured between adjacent sounding reference signal resources when transmitting the sounding reference signal for antennas of the terminal equipment.

18 Claims, 7 Drawing Sheets

201 a terminal equipment receives configuration information of one or more sounding reference signals used for antenna switching transmitted by a network device

202 the terminal equipment transmits a sounding reference signal to the network device according to the configuration information by using one or more sounding reference signal resources, wherein a guard period is configured between adjacent(or neighboring) sounding reference signal resources when transmitting the sounding reference signal for antennas of a terminal equipment

(56)        References Cited

U.S. PATENT DOCUMENTS

2021/0021391 A1      1/2021  Wang et al.
2022/0353031 A1 *  11/2022  Khoshnevisan ...... H04L 5/0053

FOREIGN PATENT DOCUMENTS

| | | | |
|---|---|---|---|
| CN | 109802801 A | 5/2019 | |
| CN | 110460416 A | 11/2019 | |
| CN | 111130742 A | 5/2020 | |
| CN | 111213417 A | 5/2020 | |
| WO | WO-2017076162 A1 * | 5/2017 | ........... H04W 72/21 |
| WO | 2019/164309 A1 | 8/2019 | |
| WO | 2019/218108 A1 | 11/2019 | |

OTHER PUBLICATIONS

CATT, "Motivation on further enhancement for NR RRM requirement in Rel-17", Agenda Item: 9.1.2, 3GPP TSG-RAN Meeting #88e, RP-200925, Electronic meeting, Jun. 29-Jul. 3, 2020.

FUTUREWEI, "Numerology considerations for beyond 52GHz", Agenda Item: 13.2.2, 3GPP TSG-RAN WG4 Meeting #96-e, R4-2011440, Electronic meeting, Aug. 17-28, 2020.

First Notification of Office Action and Search Report issued by the China National Intellectual Property Administration for corresponding Chinese Patent Application No. 202080105480.1, mailed on Mar. 21, 2024, with an English translation.

International Search Report and Written Opinion of the International Searching Authority issued by the China National Intellectual Property Administration for corresponding International Patent Application No. PCT/CN2020/121083, mailed on Jul. 15, 2021, with an English translation.

* cited by examiner

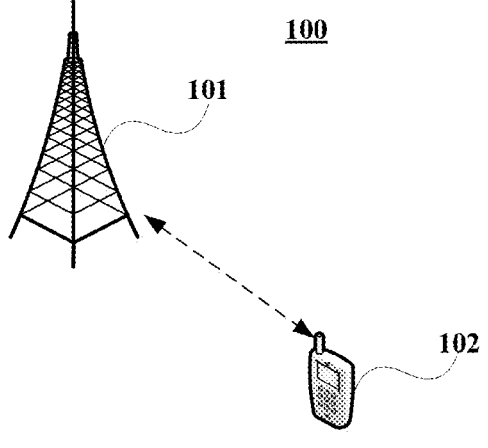

Fig. 1

201 a terminal equipment receives configuration information of one or
more sounding reference signals used for antenna switching
transmitted by a network device

202 the terminal equipment transmits a sounding reference signal to the
network device according to the configuration information by using
one or more sounding reference signal resources, wherein a guard
period is configured between adjacent(or neighboring) sounding
reference signal resources when transmitting the sounding reference
signal for antennas of a terminal equipment

Fig. 2

Last SRS resource     Guard period

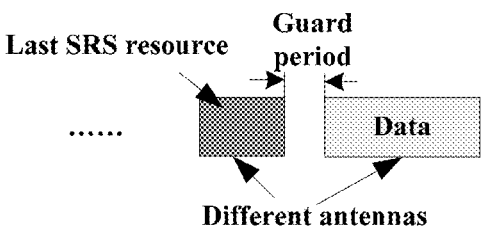

Different antennas

Fig. 9

Last SRS resource

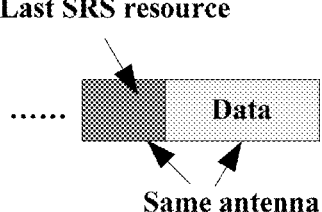

Same antenna

Fig. 10

1101 a network device transmits configuration information of one or more sounding reference signals used for antenna switching to a terminal equipment

1102 the network device receives the sounding reference signal transmitted by the terminal equipment according to the configuration information by using one or more sounding reference signal resources, wherein a guard period is configured between adjacent sounding reference signal resources of transmitting the sounding reference signal for antennas

METHOD AND APPARATUS FOR TRANSMITTING AND RECEIVING SOUNDING REFERENCE SIGNAL

CROSS-REFERENCE TO RELATED APPLICATION

This application is a continuation application of International Application PCT/CN2020/121083 filed on Oct. 15, 2020 and designated the U.S., the entire contents of which are incorporated herein by reference.

TECHNICAL FIELD

Embodiments of the present application relate to the field of communication technology.

BACKGROUND

In a wireless communication system, a network device, such as a base station, indicates a terminal equipment via control signaling to transmit a sounding reference signal (SRS) to the network device, and the terminal equipment transmits the SRS in an uplink channel according to the control signaling.

The SRS is used to detect state of the uplink channel between the terminal equipment and the network device to complete uplink channel measurement. The network device measures the uplink channel between the terminal equipment and the network device by using a strength and an interference degree of the received SRS. The results of channel measurement are used for functions such as system scheduling, time adjustment and the like, thus, the SRS plays an important role in uplink channel communication.

In current new radio (NR) systems, the SRS resources are used to transmit the SRS in a SRS resource set. Each SRS resource set contains one or more SRS resources. Each SRS resource set contains one or more resource usage instructions. The SRS resources in each resource set support only one usage.

A SRS used for antenna switching purpose estimates a downlink channel using reciprocity of uplink and downlink channels. The network device receives the SRS to obtain uplink channel estimation, and then obtains a corresponding downlink channel condition by using channel reciprocity. When the terminal equipment transmits the SRS with the antenna switching function, a guard period needs to be reserved between the SRS resources in one resource set, so as to complete the antenna switching. During the guard period, the terminal equipment cannot transmit and receive any signal.

It should be noted that, the above introduction to the background is merely for the convenience of clear and complete description of the technical solution of the present application, and for the convenience of understanding of persons skilled in the art. It cannot be regarded that the above technical solution is commonly known to persons skilled in the art just because that the solution has been set forth in the background of the present application.

SUMMARY OF THE DISCLOSURE

The inventor has found that Rel-17 is studying waveform and channel access at 52.6 GHz to 71 GHz, but the effect of phase noise is very severe in this frequency band. In order to solve this problem, it is now considered necessary to increase sub-carrier spacing (SCS) to reduce the effect of phase noise. However, there is currently no corresponding solution for how to transmit SRSs at new sub-carrier spacings.

To address at least one of the above problems, embodiments of the present application provide a method and an apparatus for transmitting and receiving a sounding reference signal.

According to one aspect of an embodiment of the present application, there is provided with a method for transmitting a sounding reference signal, including:

receiving, by a terminal equipment, configuration information of one or more sounding reference signals used for antenna switching transmitted by a network device; and transmitting, by the terminal equipment, the sounding reference signal to the network device according to the configuration information by using one or more sounding reference signal resources, wherein a guard period is configured between adjacent sounding reference signal resources when transmitting the sounding reference signal for antennas of the terminal equipment.

According to another aspect of an embodiment of the present application, there is provided with an apparatus for transmitting a sounding reference signal, including:

a receiving unit configured to receive configuration information of one or more sounding reference signals used for antenna switching transmitted by a network device; and a transmitting unit configured to transmit the sounding reference signal to the network device according to the configuration information by using one or more sounding reference signal resources, wherein a guard period is configured between adjacent sounding reference signal resources when transmitting the sounding reference signal for antennas of a terminal equipment.

According to another aspect of an embodiment of the present application, there is provided with a method for receiving a sounding reference signal, including:

transmitting, by a network device, configuration information of one or more sounding reference signals used for antenna switching to a terminal equipment; and receiving, by the network device, the sounding reference signal transmitted by the terminal equipment according to the configuration information by using one or more sounding reference signal resources, wherein a guard period is configured between adjacent sounding reference signal resources of transmitting the sounding reference signal for antennas of the terminal equipment.

According to another aspect of an embodiment of the present application, there is provided with an apparatus for receiving a sounding reference signal, including:

a transmitting unit configured to transmit configuration information of one or more sounding reference signals used for antenna switching to a terminal equipment; and a receiving unit configured to receive the sounding reference signal transmitted by the terminal equipment according to the configuration information by using one or more sounding reference signal resources, wherein a guard period is configured between adjacent sounding reference signal resources of transmitting the sounding reference signal for antennas of the terminal equipment.

According to another aspect of an embodiment of the present application, there is provided with a communication system, including:

a terminal equipment configured to receive configuration information of one or more sounding reference signals used for antenna switching transmitted by a network device, and transmit the sounding reference signal to the network device according to the configuration information by using one or more sounding reference signal resources, wherein a guard period is configured between adjacent sounding reference signal resources when transmitting the sounding reference signal for antennas of the terminal equipment; and the network device configured to transmit configuration information of one or more sounding reference signals used for antenna switching to the terminal equipment, and receive the sounding reference signal transmitted by the terminal equipment according to the configuration information by using one or more sounding reference signal resources.

An advantage of the embodiments of the present application is that a guard period is configured between adjacent sounding reference signal resources when transmitting the sounding reference signal for antennas of a terminal equipment. Thus, the sounding reference signal resources can be flexibly configured, the sounding reference signal for antenna switching can be transmitted even in a high frequency band, and the transmission efficiency and resource utilization efficiency can be improved.

With reference to the Description and drawings below, a specific embodiment of the present application is disclosed in detail, which specifies the manner in which the principle of the present application can be adopted. It should be understood that, the scope of the embodiment of the present application is not limited. Within the scope of the spirit and clause of the appended claims, the embodiment of the present application includes many variations, modifications and equivalents.

The features described and/or shown for one embodiment can be used in one or more other embodiments in the same or similar manner, can be combined with the features in other embodiments or replace the features in other embodiments.

It should be emphasized that, the term "include/comprise" refers to, when being used in the text, existence of features, parts, steps or assemblies, without exclusion of existence or attachment of one or more other features, parts, steps or assemblies.

BRIEF DESCRIPTION OF THE DRAWINGS

Elements and features described in one drawing or one embodiment of embodiments of the present application may be combined with elements and features illustrated in one or more other drawings or embodiments. Furthermore, in the drawings, like reference numerals refer to corresponding parts in the several drawings and may be used to indicate corresponding parts used in more than one embodiment.

FIG. 1 is a schematic diagram of a communication system according to an embodiment of the present application;

FIG. 2 is a schematic diagram of a method for transmitting a sounding reference signal according to an embodiment of the present application;

FIG. 9 is a schematic diagram showing that there is a guard period after a round period according to an embodiment of the present application;

FIG. 10 is a schematic diagram showing that there is no guard period after a round period according to an embodiment of the present application;

FIG. 11 is a schematic diagram of a method for receiving a sounding reference signal according to an embodiment of the present application;

DETAILED DESCRIPTION

Figure 3:
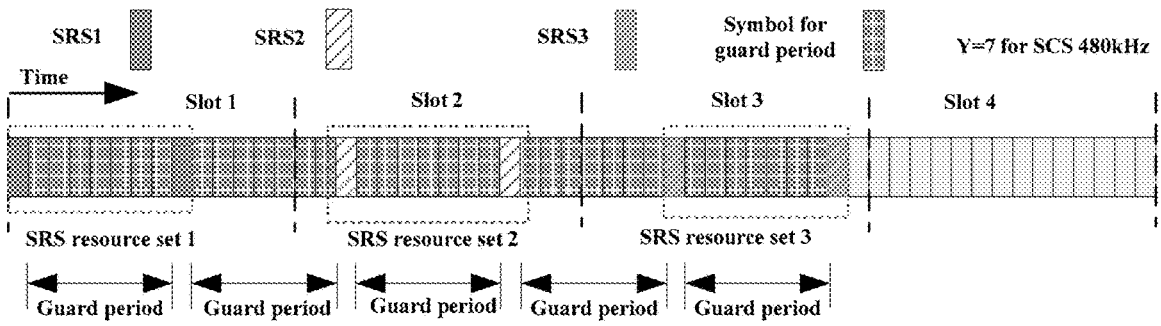
FIG. 3 is a schematic diagram of transmitting a sounding reference signal according to an embodiment of the present application.

With reference to the drawings, the foregoing and other features of the present application will become apparent through the following description. The Description and drawings specifically disclose the particular embodiment of the present application, showing part of the embodiment in which the principle of the present application can be adopted, it should be understood that the present application is not limited to the described embodiment, on the contrary, the present application includes all modifications, variations and equivalents that fall within the scope of the appended claims.

In embodiments of the present application, the terms "first," "second," and the like are used to distinguish different elements from each other in terms of appellation, but do not denote the spatial arrangement or temporal order or the like of these elements, and these elements should not be limited by these terms. The term "and/or" includes any one and all combinations of one or more of the associated listed terms. The terms "containing", "including", "having" and the like refer to presence of the stated features, elements, components or assemblies, but do not exclude presence or addition of one or more other features, elements, components or assemblies.

In embodiments of the present application, the singular form "a," "the" and the like includes the plural form, and is to be understood in a broad sense as "a kind" or "a type" and is not limited to "one"; in addition, the term "said" is to be understood to include both singular and plural forms, unless otherwise specified clearly in the context. In addition, the term "according to" shall be understood to mean "at least partially according to . . . " and the term "based on" shall be understood to mean "based at least partially on . . . ", unless otherwise specified clearly in the context.

In embodiments of the present application, the term "communication network" or "wireless communication network" may refer to a network that conforms to any communication standard, such as long term evolution (LTE), LTE-Advanced (LTE-A), wideband code division multiple access (WCDMA), high-speed packet access (HSPA), and the like.

Also, the communication between the devices in the communication system may be performed according to a communication protocol at any stage, for example, but not limited to, the following communication protocols: 1G, 2G, 2.5G, 2.75G, 3G, 4G, 4.5G and 5G, New Radio, and the like, and/or other communication protocols currently known or to be developed in the future.

In embodiments of the present application, the term "network device" refers, for example, to a device in the communication system that accesses a terminal equipment to the communication network and provides a service for the terminal equipment. Network devices may include, but are not limited to, a base station (BS), an access point (AP), a transmission reception point (TRP), a broadcast transmitter, a mobile management entity (MME), a Gateway, a server, a radio network controller (RNC), a base station controller (BSC), etc.

The base station may include, but is not limited to, a node B (NodeB or NB), an evolved node B (eNodeB or eNB), a 5G base station (gNB), and the like, and may further include a remote radio head (RRH), a remote radio unit (RRU), a relay or a low power node (e.g. femto, pico, etc.). And the term "base station" may include some or all of their functions, and each base station may provide communication coverage for a particular geographic area. The term "cell" may refer to a base station and/or its coverage area, depending on the context in which the term is used. The terms "cell" and "base station" may be interchanged without causing confusion.

In embodiments of the present application, the term "user equipment" or "terminal device" (or terminal equipment) refers, for example, to a device that accesses a communication network and receives network services through a network device. The terminal equipment may be fixed or mobile and may also be referred to as a mobile station (MS), a terminal, a subscriber station (SS), an access terminal (AT), a station, etc.

The terminal equipment may include, but is not limited to, a cellular phone, a personal digital assistant (PDA), a wireless modem, a wireless communication device, a handheld device, a machine type communication device, a laptop computer, a cordless phone, a smart phone, a smart watch, a digital camera, etc.

For another example, in a scenario such as Internet of Things (IoT) or the like, the terminal equipment may also be a machine or an apparatus for monitoring or measuring, such as but not limited to, a machine type communication (MTC) terminal, a vehicle-mounted communication terminal, a device to device (D2D) terminal, a machine to machine (M2M) terminal, etc.

Furthermore, the term "network side" or "network device side" refers to a side of the network, which may be a certain base station or may include one or more network devices as above. The term "user side" or "terminal side" or "terminal equipment side" refers to a side of a user or terminal, which may be a certain UE or may include one or more terminal equipment as above. Herein, a "device" may refer to both a network device and a terminal equipment unless otherwise specified.

The scenario of the embodiments of the present application is described below by way of examples, but the present application is not limited thereto.

FIG. 1 is a schematic diagram of a communication system according to an embodiment of the present application, schematically illustrating a case where a terminal equipment and a network device are taken as examples. As shown in FIG. 1, the communication system 100 may include a network device 101 and a terminal equipment 102. For the sake of simplicity, FIG. 1 gives illustration by taking only one terminal equipment and one network device as examples, but the embodiment of the present application is not limited thereto, and there may be a plurality of terminal equipment, for example.

In an embodiment of the present application, existing services or services that can be implemented in the future can be transmitted between the network device 101 and the terminal equipment 102. For example, these services may include, but are not limited to, enhanced Mobile Broadband (eMBB), massive Machine Type Communication (mMTC) and Ultra-Reliable and Low-Latency Communication (URLLC), etc.

In 3GPP TS 38.214, the Table 6.2.1.2-1 defines a guard period (which may also be referred to as a guard spacing) corresponding to the SRS used for antenna switching for different sub-carrier spacings as follows:

TABLE 1

| $\mu$ | $\Delta f = 2^\mu \cdot 15 [kHz]$ | Y [symbol] |
|---|---|---|
| 0 | 15 | 1 |
| 1 | 30 | 1 |
| 2 | 60 | 1 |
| 3 | 120 | 2 | where Y denotes the number of OFDM (Orthogonal Frequency Division Multiplexing) symbols used as guard periods when a corresponding sub-carrier spacing is set; $\Delta f$ denotes the size of the sub-carrier spacing. The guard period is for example defined in 3GPP TS 38.214 as follows:

The UE is configured with a guard period of Y symbols, in which the UE does not transmit any other signal, in the case the SRS resources of a set are transmitted in the same slot. The guard period is in-between the SRS resources of the set.

The inventor has found that Rel-17 is studying waveform and channel access at 52.6 GHz to 71 GHz, but the effect of phase noise is very severe in this frequency band. In order to solve this problem, it is now considered necessary to increase sub-carrier spacing (SCS) to reduce the effect of phase noise. However, there is currently no corresponding solution for how to transmit SRSs at new sub-carrier spacings. Hereinafter, embodiments of the present application will be described in detail.

Embodiments of the First Aspect

An embodiment of the present application provides a method for transmitting a sounding reference signal, which is described from a terminal equipment. FIG. 2 is a schematic diagram of a method for transmitting a sounding reference signal according to an embodiment of the present application, as shown in FIG. 2, the method including:

201, a terminal equipment receives configuration information of one or more sounding reference signals (SRSs) used for antenna switching transmitted by a network device; and 202, the terminal equipment transmits a sounding reference signal to the network device according to the configuration information by using one or more sounding reference signal resources, wherein a guard period is configured between adjacent (or neighboring) sounding reference signal resources when transmitting the sounding reference signal for antennas of a terminal equipment.

In some embodiments, the terminal equipment may also receive downlink control information (DCI) transmitted by the network device; and the terminal equipment transmits the sounding reference signal to the network device by using the sounding reference signal resources according to triggering of the downlink control information.

It should be noted that FIG. 2 only schematically illustrates the embodiments of the present application, but the present application is not limited thereto. For example, the execution order between the operations may be appropriately adjusted, and some other operations may be added or some of the operations may be reduced. Those skilled in the art may make appropriate modifications according to the above content, which are not limited to the description of FIG. 2 described above.

In some embodiments, in one round for antenna switching performed for all antennas of the terminal equipment, the sounding reference signal is transmitted. The temporally adjacent (or neighboring) sounding reference signal resources are two sounding reference signal resources in the same sounding reference signal resource set, or the temporally adjacent (or neighboring) sounding reference signal resources are two sounding reference signal resources of different sets of sounding reference signal resources.

For example, the UE is configured with a guard period of Y symbols, in which the UE does not transmit any other signal, in the case the SRS resources of a set are transmitted. The guard period is in-between the SRS resources of the set, and between the two adjacent SRS resources of one round SRS transmitting for all antennas.

For another example, the UE is configured with a guard period of Y symbols, in which the UE does not transmit any other signal, in the case the SRS resources of a set are transmitted. The guard period is in-between the SRS resources of the set, and in-between the consecutive SRS resource sets of one round SRS transmitting for all antennas.

For yet another example, the UE is configured with a guard period of Y symbols, in which the UE does not transmit any other signal, in the case the SRS resources of a set are transmitted. The guard period is in-between the SRS resources of one round SRS transmitting for all antennas.

For yet another example, the UE is configured with a guard period of Y symbols, in which the UE does not transmit any other signal, in the case the SRS resources of a set are transmitted. The guard period is in-between the SRS resources of the set and in-between SRS resource sets for sounding all the antennas once.

Only the SRS resources and the guard period are exemplarily illustrated above, but the present application is not limited thereto.

In some embodiments, the guard period includes a plurality of symbols, and the number of the plurality of symbols are different for different sub-carrier spacings.

In some embodiments, in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

For example, the Table 6.2.1.2-1 in 38.214 may be complemented as shown in Table 2.

TABLE 2

| μ | $\Delta f = 2^\mu \cdot 15$[kHz] | Y [symbol] |
|---|---|---|
| 0 | 15 | 1 |
| 1 | 30 | 1 |
| 2 | 60 | 1 |
| 3 | 120 | 2 |
| 4 | 240 | 4 |
| 5 | 480 | 7 |
| 6 | 960 | 14 |

It is to be noted that the above Table 2 only schematically illustrates the corresponding cases of the sub-carrier spacing and the guard period in different numerologies of the embodiments of the present application, but the present application is not limited thereto, and for example, Y may specifically be other numbers.

In some embodiments, the number Y of symbols for the guard period is predefined, e.g., as shown in Table 2 above; or is configured by the network device, for example, configured by the network device to a terminal equipment via radio resource control (RRC) signaling; or is pre-determined by the terminal equipment, for example, determined by the UE using configuration signaling from the network device in combination with the processing capability of UE itself.

Thus, the guard period (guard spacing) of the SRS for antenna switching can be determined or configured even in the case of a high frequency band and the sub-carrier spacing greater than 120 kHz. In new sub-carrier spacings, the UE can transmit the SRS for antenna switching, which can improve transmission efficiency and improve resource utilization.

In 3GPP TS 38.214, for a SRS resource set used for an antenna switching function, the guard period (guard spacing) is satisfied between the SRS resource set in such a way that the SRS can only be transmitted on the last six symbols of one slot, and the UE configures only one SRS resource set for the same purpose in one slot.

In an embodiment of the present application, the sounding reference signal may be transmitted on any one or more symbols in a slot. In some embodiments, transmission is performed between the SRS resources and between the sets of SRS resources according to a minimum guard period.

FIG. 3 is a schematic diagram of transmitting a sounding reference signal according to an embodiment of the present application, schematically illustrating that a terminal equipment transmits a SRS for an antenna switching function. Taking the sub-carrier spacing is 480 kHz as an example, the corresponding guard period is set to be 7 OFDM symbols (Y=7). That is, the guard period between the SRS resources used for antenna switching is 7 OFDM symbols, which is less than 14 OFDM symbols in one slot.

In the SRS transmission shown in FIG. 3, there are two SRS resources for each SRS resource set. Each SRS resource occupies one OFDM symbol. In slot 1, the first OFDM symbol corresponds to the first SRS resource of the first SRS resource set, followed by a guard period of 7 OFDM symbols, and then the second SRS resource of the first SRS resource set. As shown in FIG. 3, the first SRS resource set is followed by a guard period of 7 OFDM symbols, and then the second SRS resource set.

In the SRS transmission shown in FIG. 3, the SRS resources may be configured at any position of one slot, such as the first OFDM symbol. At this case, when the terminal equipment transmits the SRSs for antenna switching for all antennas in turn, the spacing (denoted as P1) between the SRS resources within one SRS resource set is Y OFDM symbols. During one round period when the terminal equipment transmits the SRSs for antenna switching for all antennas in turn, the spacing (denoted as P2) between adjacent sets of SRS resources is also Y OFDM symbols.

In embodiments of the present application, the time when each antenna transmits the SRS for antenna switching in turn may be referred to as one round period. P1 and P2 may be the same, for example, both being Y OFDM symbols; P1 and P2 may be different, for example, P1 is Y1 OFDM symbols, and P2 is Y2 OFDM symbols.

Thus, the guard period (guard spacing) between the sets of SRS resources can be increased to ensure that the sets of SRS resources are transmitted at a certain period, and the signaling scheduling overhead can be further saved.

In some embodiments, sounding reference signal resource sets of the same type are able to be configured in different slots; and in other embodiments, sounding reference signal resource sets of different types, able to be configured in the same slot.

In some embodiments, the same sounding reference signal resource is able to be configured on symbols of different slots.

For example, SRS resources may occupy 1, 2, 4 consecutive OFDM symbols. To enhance the coverage of the SRS, one SRS resource may also occupy more OFDM symbols. In this case, one SRS resource may span two slots.

Figure 4:
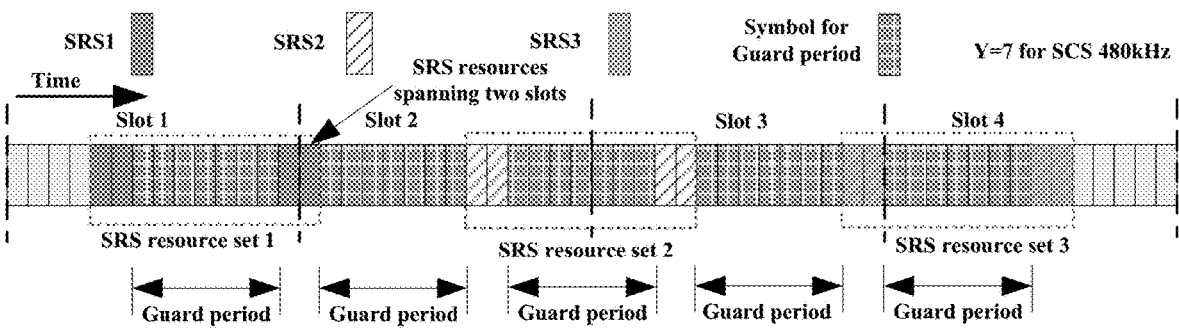
FIG. 4 is another schematic diagram of transmitting a sounding reference signal according to an embodiment of the present application.

FIG. 4 is another schematic diagram of transmitting a sounding reference signal according to an embodiment of the present application, taking a sub-carrier spacing is 480 kHz as an example.

It is still assumed that the guard period is 7 OFDM symbols, Y=7. One SRS resource set has two SRS resources, and it is assumed that each SRS resource occupies two OFDM symbols. The SRS resources may be configured at any symbol position in one slot.

As shown in FIG. 4, an SRS resource set 1 starts with the fifth symbol of the first slot, occupying two OFDM symbols, followed by a guard period of 7 OFDM symbols. The second SRS resource of the first SRS resource set occupies two OFDM symbols and spans slot 1 and slot 2. Next, the terminal equipment maintains a guard period between an SRS resource set 1 and an SRS resource set 2, occupying 7 OFDM symbols, and then an SRS resource set 2.

In FIG. 4, all guard periods are guard periods that satisfying the minimum guard periods (guard spacing) between the SRS resources, that is, Y=7. An SRS resource set 3 is similar to the SRS resource set 2, and will not be described further. As shown in FIG. 4, two SRS resources exist in slot 2 and slot 3 respectively. The two resources belong to different sets of resources.

On the other hand, if there can be only one resource set of the same type in one slot, that is, the SRS resource set 1 and the SRS resource set 2 cannot be configured successively in the slot 2, the SRS resource set 2 is postponed to the slot 3, which reduces efficiency and wastes a portion of uplink resources.

In FIG. 4 of the embodiment of the present application, the second SRS resource of the first SRS resource set occupies two OFDM symbols, just spanning slot 1 and slot 2. In order to improve transmission efficiency and to transmit the SRS as soon as possible, the SRS resource is scheduled to be transmitted across slots, occupying the last symbol of the slot 1 and the first symbol of the slot 2. Therefore, such method of the embodiment of the present application further improves the efficiency and saves a part of uplink resources.

In some embodiments, the terminal equipment is configured to, in a case where the same sounding reference signal resource is configured on symbols of different slots, delay the sounding reference signal resource by one or more symbols, so that the sounding reference signal resource is located in the same slot.

For example, one SRS resource occupies a plurality of OFDM symbols; in order to reduce scheduling complexity and to facilitate processing, the starting position of the SRS resource may be aligned with an adjacent slot boundary to prevent the SRS resource from spanning two slots.

Figure 5:
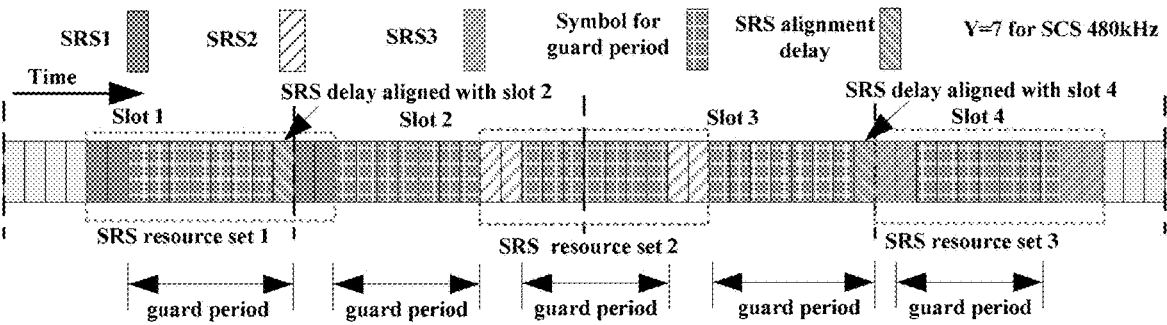
FIG. 5 is another schematic diagram of transmitting a sounding reference signal according to an embodiment of the present application.

FIG. 5 is another schematic diagram of transmitting a sounding reference signal according to an embodiment of the present application, taking a sub-carrier spacing is 480 kHz as an example. It is still assumed that the guard period is 7 OFDM symbols, Y=7. One SRS resource set has two SRS resources, and each SRS resource occupies two OFDM symbols.

As shown in FIG. 5, an SRS resource set 1 starts with the fifth symbol of the first slot, occupying two OFDM symbols, followed by a guard period (guard spacing) of 7 OFDM symbols.

As shown in FIG. 5, in order to avoid transmission across slot 1 and slot 2, the second SRS resource of the first SRS resource set is delayed by 1 OFDM symbol, aligned with the starting position of the slot 2, and occupies the first two symbols of the slot 2. Next, the SRS resource set 2 maintains a guard period of 7 OFDM symbols without additional delay. Then, the first SRS resource of the SRS resource set 3 is also delayed by one OFDM symbol, aligned with the starting position of a slot 4.

In some scenarios, the terminal equipment needs to transmit signaling/data between sets of SRS resources for antenna switching. For example, signaling/data is used to indicate transmission settings of the next SRS resource (set), etc. At this case, the resources between SRS resource sets cannot all be guard periods, otherwise, the terminal equipment cannot transmit signaling/data between the SRS resource sets for antenna switching.

In some embodiments, the terminal equipment is configured to, after transmitting the sounding reference signals, on one or more consecutive symbols immediately adjacent to a sounding reference signal resource of the sounding reference signal, transmit control information and/or data information by using an antenna identical to the antenna of the sounding reference signal resource.

For example, the signal may be transmitted at the end of the first SRS resource set of two temporally adjacent SRS resource sets.

Figure 6:
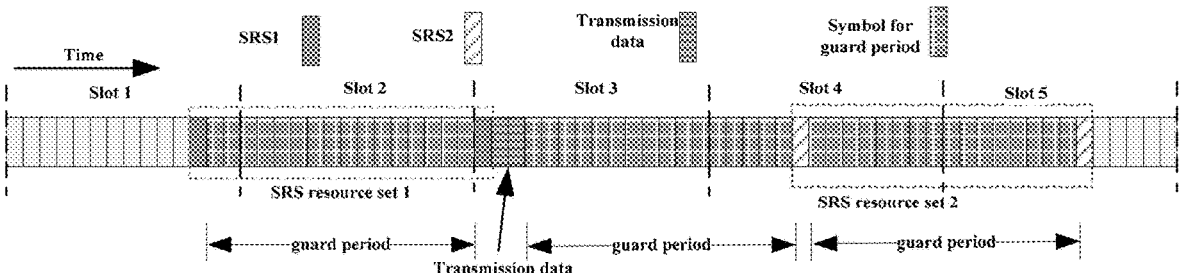
FIG. 6 is another schematic diagram of transmitting a sounding reference signal according to an embodiment of the present application.

FIG. 6 is another schematic diagram of transmitting a sounding reference signal according to an embodiment of the present application. As shown in FIG. 6, there are two SRS resource sets in common, and each SRS resource set contains two SRS resources. Each SRS resource occupies one OFDM symbol. The guard period (guard spacing) is assumed to be 16 OFDM symbols.

As shown in FIG. 6, the first SRS resource of the first SRS resource set starts from the 12th OFDM symbol of the first slot (slot 1), and then the terminal equipment maintains the guard period between the SRS resources, occupying 16

OFDM symbols. The second SRS resource next to the first SRS resource set, it occupies the first OFDM symbol of the third slot (slot 3).

Then, as shown in FIG. 6, the terminal equipment transmits a signal occupying two OFDM symbols at the end of the SRS resource. The signal shares an antenna with the second SRS resource of the first SRS resource set. Thereafter, the terminal equipment maintains the guard period between the SRS resource sets as 16 OFDM symbols, followed by the SRS resource set 2.

Thus, when the terminal equipment needs to transmit a signal (other than SRS), the terminal equipment can use the same antenna as the previous SRS resource in succession to further reduce the channel idle time. If the effect of high-band LBT (listen before talk) is considered, it does not require deliberate channel sensing for the signal transmission, and the transmission delay caused by LBT effect can be further avoided.

In some embodiments, when the terminal equipment transmits the SRS for antenna switching for all antennas in turn, it may also be determined whether a guard period is used.

In some embodiment, the terminal equipment is configured to, before one round of transmitting the sounding reference signal for antennas of the terminal equipment, determine whether an antenna used by a first sounding reference signal resource in the round is the same as an antenna used by a temporally adjacent resource preceding the first sounding reference signal resource;

when it is determined that the antennas are not the same antenna, set the guard period between the first sounding reference signal resource and the resource; when it is determined that the antennas are the same antenna, set no guard period between the first sounding reference signal resource and the resource.

For example, whether a guard period (guard spacing) needs to exist before the first SRS resource of the first SRS resource set at the beginning of a round period may be determined according to whether a different antenna is used.

Figure 7:
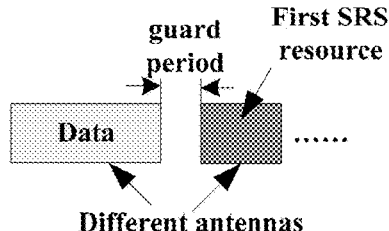
FIG. 7 is a schematic diagram showing that there is a guard period before a round period according to an embodiment of the present application.

FIG. 7 is a schematic diagram showing that there is a guard period before a round period according to an embodiment of the present application. As shown in FIG. 7, the data before the first SRS resource and the current SRS resource are transmitted using different antennas, thus a guard period needs to be set before the first SRS resource.

Figure 8:
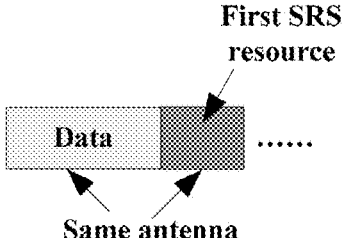
FIG. 8 is a schematic diagram showing that there is no guard period before a round period according to an embodiment of the present application.

FIG. 8 is a schematic diagram showing that there is no guard period before a round period according to an embodiment of the present application. As shown in FIG. 8, the data before the first SRS resource and the current SRS resource are transmitted using the same antenna, thus a guard period does not need to be set before the first SRS resource.

In some embodiments, the terminal equipment is configured to, after one round of transmitting the sounding reference signal for antennas of the terminal equipment, determine whether an antenna used by a last sounding reference signal resource in the round is the same as an antenna used by a temporally adjacent resource following the last sounding reference signal resource;

when it is determined that the antennas are not the same antenna, set the guard period between the last sounding reference signal resource and the resource; when it is determined that the antennas are the same antenna, set no guard period between the last sounding reference signal resource and the resource.

For example, whether a guard period (guard spacing) needs to exist after the last SRS resource of the last SRS resource set at the end of a round period may be determined according to whether a different antenna is used.

FIG. 9 is a schematic diagram showing that there is a guard period after a round period according to an embodiment of the present application. As shown in FIG. 9, the data after the last SRS resource and the current SRS resource are transmitted using different antennas, thus a guard period needs to be set after the last SRS resource.

FIG. 10 is a schematic diagram showing that there is no guard period after a round period according to an embodiment of the present application. As shown in FIG. 10, the data after the last SRS resource and the current SRS resource are transmitted using the same antenna, thus a guard period does not need to be set after the last SRS resource.

The above embodiments merely exemplify the embodiments of the present application, but the present application is not limited thereto, and appropriate modifications may be made on the basis of the above embodiments. For example, each of the above embodiments may be used alone or in combination with one or more of the above embodiments.

It can be seen from the above-mentioned embodiments that a guard period is configured between adjacent sounding reference signal resources of transmitting the sounding reference signal for antennas of a terminal equipment. Thus, the sounding reference signal resources can be flexibly configured, the sounding reference signal for antenna switching can be transmitted even in a high frequency band, and the transmission efficiency and resource utilization efficiency can be improved.

Embodiments of the Second Aspect

An embodiment of the present application provides a method for receiving a sounding reference signal, which is described from a network device, and the same contents as those of the embodiments of the first aspect will not be described in detail.

FIG. 11 is a schematic diagram of a method for receiving a sounding reference signal according to an embodiment of the present application, as shown in FIG. 11, the method including:

1101, a network device transmits configuration information of one or more sounding reference signals (SRSs) used for antenna switching to a terminal equipment; and

1102, the network device receives the sounding reference signal (SRS) transmitted by the terminal equipment according to the configuration information by using one or more sounding reference signal (SRS) resources, wherein a guard period is configured between adjacent sounding reference signal (SRS) resources of transmitting the sounding reference signal for antennas of the terminal equipment.

In some embodiments, the network device may also transmit downlink control information to the terminal equipment, the downlink control information triggering the terminal equipment to transmit the sounding reference signal to the network device by using the sounding reference signal (SRS) resources.

It should be noted that FIG. 11 only schematically illustrates the embodiment of the present application, but the present application is not limited thereto. For example, the execution order between the operations may be appropriately adjusted, and some other operations may be added or some of the operations may be reduced. Those skilled in the art may make appropriate modifications according to the above content, which are not limited to the description of FIG. 11 described above.

In some embodiments, the network device determines a transmission period of the sounding reference signal according to a time length of the sounding reference signal (SRS) resource and the guard period.

In some scenarios, the sum of time length of the number of SRS resources used for antenna switching and a corresponding guard period may be greater than or equal to a slot length corresponding to a sub-carrier spacing at this moment; in this case, if a periodic SRS resource is configured using RRC signaling, a transmission period for the RRC to configure the SRS resource is limited.

In some embodiments, for the same sub-carrier spacing, in a case where a sum of the time length of the sounding reference signal (SRS) resource and the guard period is greater than N slots, the transmission period of the sounding reference signal is configured as N+1 by radio resource control (RRC) signaling; where, N is a positive integer.

For example, the sum of the time length occupied by an SRS resource for antenna switching and the corresponding guard period time length is defined as $T_{all}$. The transmission period of the SRS resource cannot be configured to be smaller than or equal to a certain number of slots of the $T_{all}$ time length.

For another example, N is an integer greater than or equal to 1 and smaller than or equal to 2560. However, the present application is not limited thereto, and N may be other positive integers, such as greater than or equal to 1 and smaller than or equal to 81920.

Figure 12:
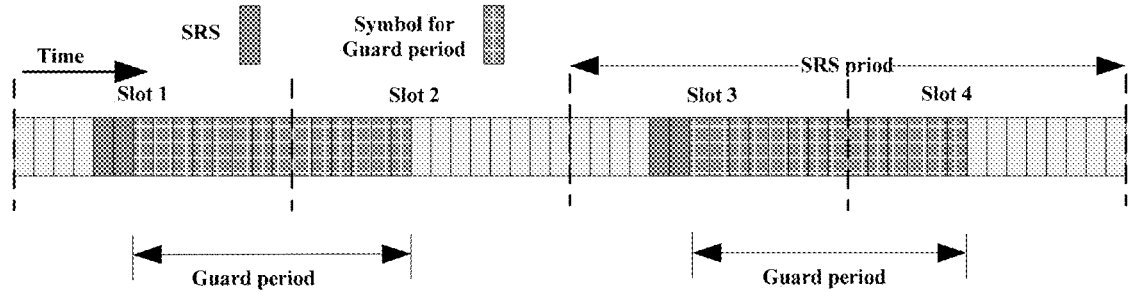
FIG. 12 is another schematic diagram of transmitting a sounding reference signal according to an embodiment of the present application.

FIG. 12 is a schematic diagram of transmitting a sounding reference signal according to an embodiment of the present application. As shown in FIG. 12, the guard period is 14 symbols, i.e. the time length is just one slot, and the SRS resource is two OFDM symbols. At this case, $T_{all}$ is 16 symbols, thus the SRS resource transmission period cannot be configured as 1 slot.

For example, at this case, the transmission period of the periodic SRS resource conflicts with the guard period (guard spacing), and thus cannot be configured as 1 slot. The corresponding configuration is in 38.331, SRS-Periodicity-AndOffset::≠{sl1 NULL}, i.e. not configurable as a period of 1 slot. Other configuration parameters may be selected. Alternatively, when the SRS for antenna switching is transmitted, neither SRS-PeriodicityAnd Offset nor SRS-Period-icityAndOffset-r16 in 38.331 can be configured as {sl1 NULL}, and other configuration parameters can be selected.

In some embodiments, the guard period includes a plurality of symbols, and the number of the symbols are different for different sub-carrier spacings. For example, in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

The above embodiments merely exemplify the embodiments of the present application, but the present application is not limited thereto, and appropriate modifications may be made on the basis of the above embodiments. For example, each of the above embodiments may be used alone or in combination with one or more of the above embodiments.

It can be seen from the above-mentioned embodiments that a guard period is configured between adjacent sounding reference signal resources of transmitting the sounding reference signal for antennas of a terminal equipment. Thus, the sounding reference signal resources can be flexibly configured, the sounding reference signal for antenna switching can be transmitted even in a high frequency band, and the transmission efficiency and resource utilization efficiency can be improved.

Embodiments of the Third Aspect

An embodiment of the present application provides an apparatus for transmitting a sounding reference signal. The apparatus may be, for example, a terminal equipment or may be a certain or some parts or components configured in the terminal equipment, and the same content as the embodiments of the first aspect will not be described in detail.

Figure 13:
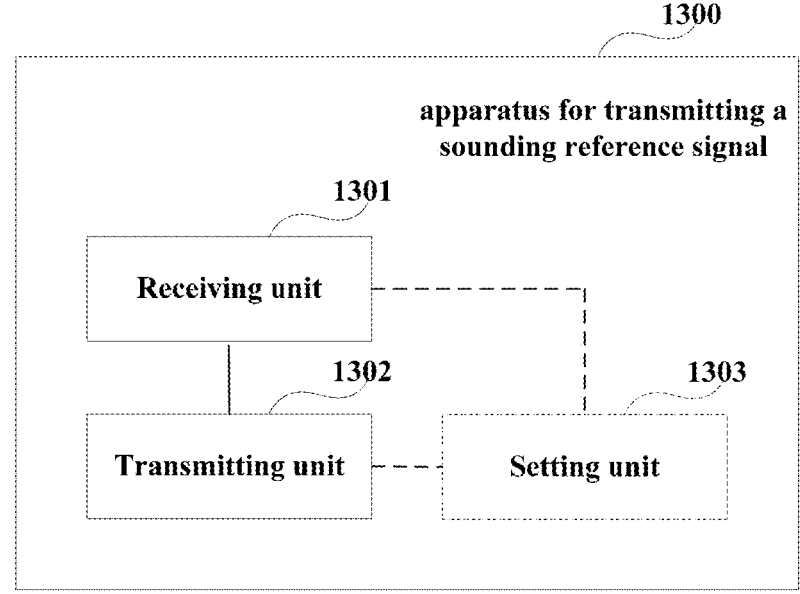
FIG. 13 is a schematic diagram of an apparatus for transmitting a sounding reference signal according to an embodiment of the present application.

FIG. 13 is a schematic diagram of an apparatus for transmitting a sounding reference signal according to an embodiment of the present application. As shown in FIG. 13, the apparatus 1300 for transmitting a sounding reference signal including:

a receiving unit 1301 configured to receive configuration information of one or more sounding reference signals used for antenna switching transmitted by a network device; and a transmitting unit 1302 configured to transmit a sounding reference signal to the network device according to the configuration information by using one or more sounding reference signal resources, wherein a guard period is configured between adjacent sounding reference signal resources when transmitting the sounding reference signal for antennas of a terminal equipment.

In some embodiments, in one round for antenna switching performed for all antennas of the terminal equipment, the sounding reference signal is transmitted.

In some embodiments, the temporally adjacent sounding reference signal resources are two sounding reference signal resources in the same sounding reference signal resource set.

In some embodiments, the temporally adjacent sounding reference signal resources are two sounding reference signal resources in different sounding reference signal resource sets.

In some embodiments, in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

In some embodiments, the number Y of symbols of the guard period is predefined, or is configured by the network device, or is predetermined by the terminal equipment.

In some embodiments, sounding reference signal resource sets of the same type are able to be configured in different slots; or, sounding reference signal resource sets of different types are able to be configured in the same slot.

In some embodiments, the same sounding reference signal resource is able to be configured on symbols of different slots.

In some embodiments, the transmitting unit 1302 is further configured to, in a case where the same sounding reference signal resource is configured on symbols of different slots, delay the sounding reference signal resource by one or more symbols, so that the sounding reference signal resource is located in the same slot.

In some embodiments, the transmitting unit 1302 is further configured to, after transmitting the sounding reference signals, on one or more consecutive symbols immediately adjacent to a sounding reference signal resource of the sounding reference signal, transmit control information and/ or data information by using an antenna identical to the antenna of the sounding reference signal resource.

In some embodiments, the receiving unit 1301 also receives downlink control information transmitted by the network device; and the transmitting unit 1302 is further configured to transmit the sounding reference signal to the network device by using the sounding reference signal resources according to triggering of the downlink control information.

In some embodiments, the sounding reference signal is transmitted on any one or more symbols in a slot.

In some embodiments, the guard period includes a plurality of symbols, and the number of the symbols are different for different sub-carrier spacings.

In some embodiments, as shown in FIG. 13, the apparatus 1300 for transmitting a sounding reference signal further includes:

a setting unit 1303 configured to, before one round of transmitting the sounding reference signal for antennas of the terminal equipment, determine whether an antenna used by a first sounding reference signal resource in the round is the same as an antenna used by a temporally adjacent resource preceding the first sounding reference signal resource;

when it is determined that the antennas are not the same antenna, set the guard period between the first sounding reference signal resource and the resource; when it is determined that the antennas are the same antenna, and set no guard period between the first sounding reference signal resource and the resource.

In some embodiments, as shown in FIG. 13, the apparatus 1300 for transmitting a sounding reference signal further includes:

a setting unit 1303 configured to, after one round of transmitting the sounding reference signal for antennas of the terminal equipment, determine whether an antenna used by a last sounding reference signal resource in the round is the same as an antenna used by a temporally adjacent resource following the last sounding reference signal resource;

when it is determined that the antennas are not the same antenna, set the guard period between the last sounding reference signal resource and the resource; when it is determined that the antennas are the same antenna, and set no guard period between the last sounding reference signal resource and the resource.

The above embodiments merely exemplify the embodiments of the present application, but the present application is not limited thereto, and appropriate modifications may be made on the basis of the above embodiments. For example, each of the above embodiments may be used alone or in combination with one or more of the above embodiments.

It should be noted that only the components or modules related to the present application have been described above, but the present application is not limited thereto. The apparatus 1300 for transmitting a sounding reference signal may further include other components or modules, and related art may be referred to for details of these components or modules.

In addition, for the sake of simplicity, FIG. 13 exemplarily shows only the connection relationship or signal trend between the various components or modules, however, it should be clear to a person skilled in the art that various related techniques such as bus connection may be used. The various components or modules described above may be implemented by hardware facilities such as a processor, a memory, a transmitter, a receiver, etc.; implementation of the present application is not limited thereto.

It can be seen from the above-mentioned embodiments that a guard period is configured between adjacent sounding reference signal resources of transmitting the sounding reference signal for antennas of a terminal equipment. Thus, the sounding reference signal resources can be flexibly configured, the sounding reference signal for antenna switching can be transmitted even in a high frequency band, and the transmission efficiency and resource utilization efficiency can be improved.

Embodiments of the Fourth Aspect

An embodiment of the present application provides an apparatus for receiving a sounding reference signal. The apparatus may be, for example, a network device or may be a certain or some parts or components configured in the network device, and the same content as the embodiments of the first and second aspects will not be described in detail.

Figure 14:
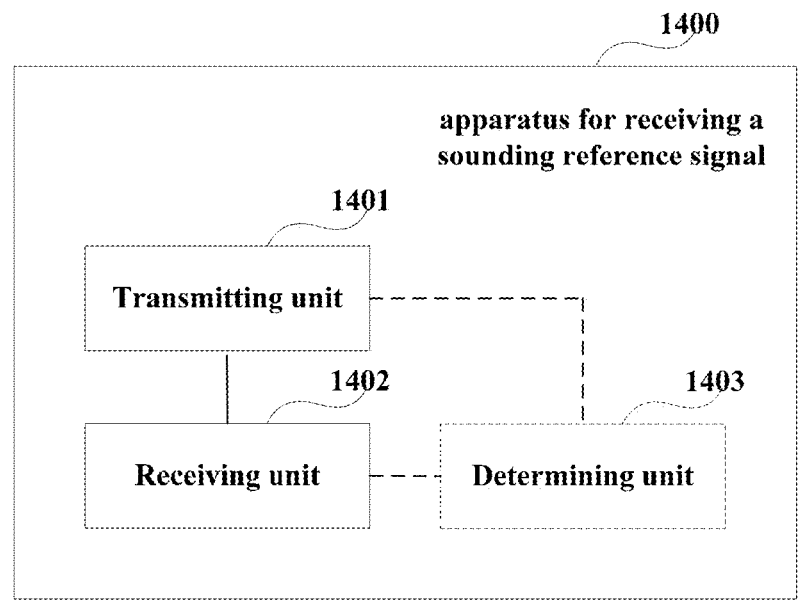
FIG. 14 is a schematic diagram of an apparatus for receiving a sounding reference signal according to an embodiment of the present application.

FIG. 14 is a schematic diagram of an apparatus for receiving a sounding reference signal according to an embodiment of the present application. As shown in FIG. 14, the apparatus 1400 for receiving a sounding reference signal includes:

a transmitting unit 1401 configured to transmit configuration information of one or more sounding reference signals used for antenna switching to a terminal equipment; and a receiving unit 1402 configured to receive the sounding reference signal transmitted by the terminal equipment according to the configuration information by using one or more sounding reference signal resources, wherein a guard period is configured between adjacent sounding reference signal resources of transmitting the sounding reference signal for antennas of the terminal equipment.

In some embodiments, the transmitting unit 1401 is further configured to transmit downlink control information to the terminal equipment, the downlink control information triggering the terminal equipment to transmit the sounding reference signal to the network device by using the sounding reference signal resources.

In some embodiments, as shown in FIG. 13, the apparatus 1400 for receiving a sounding reference signal further includes:

a determining unit 1403 configured to determine a transmission period of the sounding reference signal according to a time length of the sounding reference signal resource and the guard period.

In some embodiments, for the same sub-carrier spacing, in a case where a sum of the time length of the sounding reference signal resource and the guard period is greater than N slots, the transmission period of the sounding reference signal is configured as N+1 by radio resource control signaling; where, N is a positive integer, for example, N is an integer greater than or equal to 1 and less than or equal to 2560.

In some embodiments, the guard period includes a plurality of symbols, and the number of the symbols are different for different sub-carrier spacings.

In some embodiments, in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

The above embodiments merely exemplify the embodiments of the present application, but the present application is not limited thereto, and appropriate modifications may be made on the basis of the above embodiments. For example, each of the above embodiments may be used alone or in combination with one or more of the above embodiments.

It should be noted that only the components or modules related to the present application have been described above, but the present application is not limited thereto. The apparatus 1400 for receiving a sounding reference signal may further include other components or modules, and related art may be referred to for details of these components or modules.

In addition, for the sake of simplicity, FIG. 14 exemplarily shows only the connection relationship or signal trend between the various components or modules, however, it should be clear to a person skilled in the art that various related techniques such as bus connection may be used. The various components or modules described above may be implemented by hardware facilities such as a processor, a memory, a transmitter, a receiver, etc.; implementation of the present application is not limited thereto.

It can be seen from the above-mentioned embodiments that a guard period is configured between adjacent sounding reference signal resources of transmitting the sounding reference signal for antennas of a terminal equipment. Thus, the sounding reference signal resources can be flexibly configured, the sounding reference signal for antenna switching can be transmitted even in a high frequency band, and the transmission efficiency and resource utilization efficiency can be improved.

Embodiments of the Fifth Aspect

An embodiment of the present application further provides a communication system, which can refer to FIG. 1, and the same content as the embodiments of the first to fourth aspects will not be described in detail. The communication system may include:

a terminal equipment 102 configured to receive configuration information of one or more sounding reference signals used for antenna switching transmitted by a network device 101, and transmit a sounding reference signal to the network device 101 according to the configuration information by using one or more sounding reference signal resources, wherein a guard period is configured between adjacent sounding reference signal resources when transmitting the sounding reference signal for antennas of the terminal equipment 102; and the network device 101 configured to transmit configuration information of one or more sounding reference signals used for antenna switching to the terminal equipment 102, and receive the sounding reference signal transmitted by the terminal equipment 102 according to the configuration information by using one or more sounding reference signal resources.

An embodiment of the present application further provides a network device, which may be, for example, a base station, but the present application is not limited thereto, and may also be other network devices.

Figure 15:
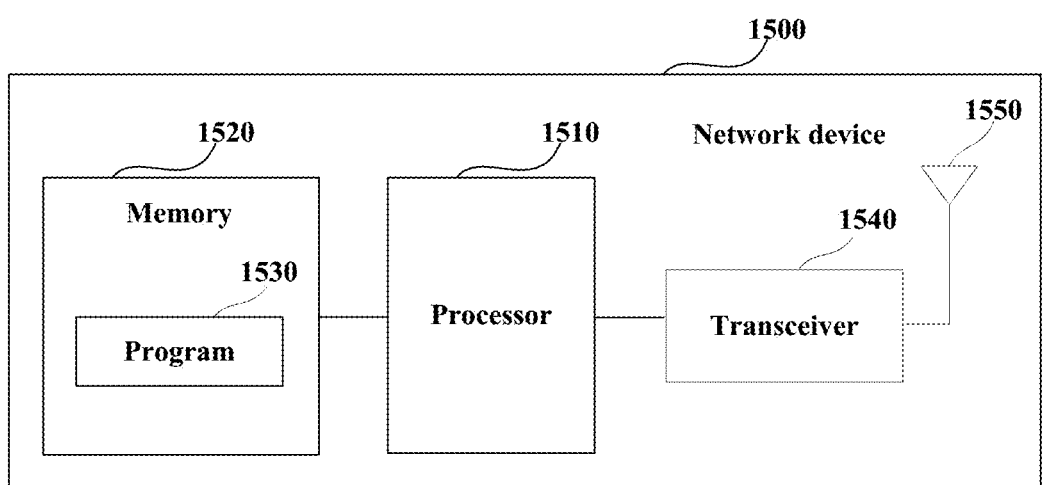
FIG. 15 is a schematic diagram of a network device according to an embodiment of the present application.

FIG. 15 is a configuration diagram of a network device according to an embodiment of the present application. As shown in FIG. 15, the network device 1500 may include a processor 1510 (such as a central processing unit (CPU)) and a memory 1520; the memory 1520 is coupled to the processor 1510. The memory 1520 can store various data; a program 1530 for information processing is also stored and the program 1530 is executed under the control of the processor 1510.

For example, the processor 1510 may be configured to execute a program to implement the method for receiving a sounding reference signal as described in the embodiment of the second aspect. For example, the processor 1510 may be configured to control to: transmitting configuration information of one or more sounding reference signals (SRSs) used for antenna switching to a terminal equipment; and to receive the sounding reference signal (SRS) transmitted by the terminal equipment according to the configuration information by using one or more sounding reference signal (SRS) resources, wherein a guard period is configured between adjacent sounding reference signal (SRS) resources of transmitting the sounding reference signal for antennas of the terminal equipment.

In addition, as shown in FIG. 15, the network device 1500 may further include a transceiver 1540 and an antenna 1550, etc.; the functions of the above-mentioned components are similar to those of the relevant art, and will not be described again here. It is worth noting that the network device 1500 is not necessarily required to include all of the components shown in FIG. 15; in addition, the network device 1500 may further include components not shown in FIG. 15, with reference to the relevant art.

An embodiment of the present application further provides a terminal equipment, but the present application is not limited thereto, and may also be other devices.

Figure 16:
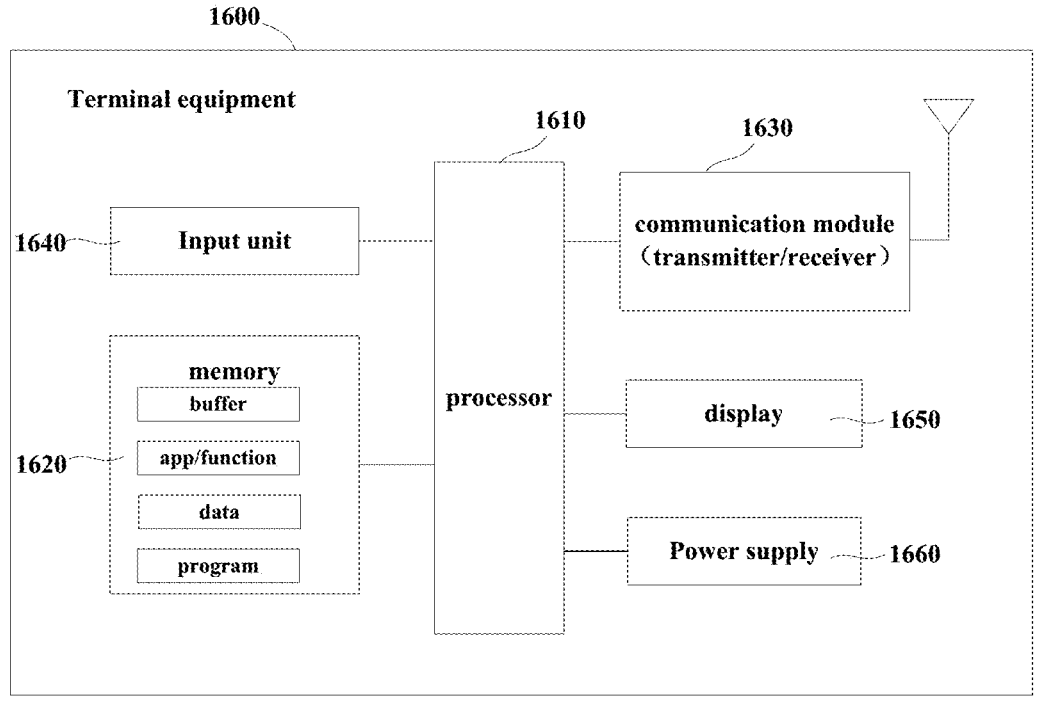
FIG. 16 is a schematic diagram of a terminal equipment according to an embodiment of the present application.

FIG. 16 is a schematic diagram of a terminal equipment according to an embodiment of the present application. As shown in FIG. 16, the terminal equipment 1600 may include a processor 1610 and a memory 1620; the memory 1620 stores data and program and is coupled to the processor 1610. It is worth noting that this figure is exemplary; other types of structures may also be used in addition to or instead of the structure to implement telecommunications functions or other functions.

For example, the processor 1610 may be configured to execute a program to implement the method for transmitting a sounding reference signal as described in the embodiment of the first aspect. For example, the processor 1610 may be configured to control to: receive configuration information of one or more sounding reference signals (SRSs) used for antenna switching transmitted by a network device, and to transmit a sounding reference signal to the network device according to the configuration information by using one or more sounding reference signal resources, wherein a guard period is configured between adjacent sounding reference signal resources when transmitting the sounding reference signal for antennas of the terminal equipment.

As shown in FIG. 16, the terminal equipment 1600 may further include a communication module 1630, an input unit 1640, a display 1650 and a power supply 1660. The functions of the above-mentioned components are similar to those of the relevant art, and will not be described again here. It is worth noting that the terminal equipment 1600 is not necessarily required to include all of the components shown in FIG. 16, and the above components are not necessary; in addition, the terminal equipment 1600 may further include components not shown in FIG. 16, with reference to the relevant art.

Embodiments of the present application further provide a computer program, wherein when the program is executed in a terminal equipment, the program causes the terminal equipment to execute the method for transmitting a sounding reference signal described in the embodiments of the first aspect.

Embodiments of the present application further provide a storage medium in which a computer program is stored, wherein the computer program causes the terminal equipment to execute the method for transmitting a sounding reference signal described in the embodiments of the first aspect.

Embodiments of the present application further provide a computer program, wherein when the program is executed in a network device, the program causes the network device to execute the method for receiving a sounding reference signal described in the embodiments of the first aspect.

Embodiments of the present application further provide a storage medium in which a computer program is stored, wherein the computer program causes the terminal equipment to execute the method for receiving a sounding reference signal described in the embodiments of the second aspect.

The above apparatus and method of the present application may be implemented by hardware, or may be implemented by hardware in combination with software. The present application relates to a computer-readable program that, when executed by a logic component, enables the logic component to implement the apparatus or constituent components described above, or enables the logic component to implement the various methods or steps described above. The present application also relates to a storage medium for storing the above program, such as a hard disk, a magnetic disk, an optical disk, a DVD, a flash memory, etc.

The method/apparatus described in connection with embodiments of the present application may be embodied directly in hardware, a software module executed by a processor, or a combination of both. For example, one or more of the functional blocks and/or one or more combinations of the functional blocks shown in the drawings may correspond to each software module or each hardware module of a computer program flow. These software modules may correspond to the respective steps shown in the drawings. The hardware modules may be implemented, for example, by solidifying the software modules using a field programmable gate array (FPGA).

A software module may be located in an RAM memory, a flash memory, an ROM memory, an EPROM memory, an EEPROM memory, a register, a hard disk, a removable disk, a CD-ROM, or any other form of storage medium known in the art. A storage medium may be coupled to the processor to enable the processor to read information from and write information to the storage medium, or the storage medium may be an integral part of the processor. The processor and the storage medium may reside in an ASIC. The software module may be stored in a memory of the mobile terminal or in a memory card insertable into the mobile terminal. For example, if the device (such as a mobile terminal) employs a large-capacity MEGA-SIM card or a large-capacity flash memory device, the software module can be stored in the MEGA-SIM card or the large-capacity flash memory device.

One or more of the functional blocks and/or one or more combinations of the functional blocks depicted in the accompanying drawings may be implemented as a general purpose processor, a digital signal processor (DSP), an application specific integrated circuit (ASIC), a field programmable gate array (FPGA) or other programmable logic devices, a discrete gate or a transistor logic device, a discrete hardware component, or any suitable combination thereof designed to perform the functions described in the present application. One or more of the functional blocks and/or one or more combinations of the functional blocks depicted in the accompanying drawings may also be implemented as combination of computing devices, e.g., combination of a DSP and a microprocessor, a plurality of microprocessors, one or more microprocessors in communication with the DSP, or any other such configuration.

The present application is described in combination with specific embodiments hereinabove, but a person skilled in the art should know clearly that the description is exemplary, but not limitation to the protection scope of the present application. A person skilled in the art can make various variations and modifications to the present application according to spirit and principle of the application, and these variations and modifications should also be within the scope of the present application.

As to implementations containing the above embodiments, following supplements are further disclosed.

1. A method for transmitting a sounding reference signal, including:

receiving, by a terminal equipment, configuration information of one or more sounding reference signals (SRSs) used for antenna switching transmitted by a network device; and transmitting, by the terminal equipment, transmit a sounding reference signal to the network device according to the configuration information by using one or more sounding reference signal resources, wherein a guard period (or referred to as a guard spacing) is configured between adjacent sounding reference signal resources when transmitting the sounding reference signal for antennas of the terminal equipment.

2. The method according to the supplement 2, wherein in one round for antenna switching performed for all antennas of the terminal equipment, the sounding reference signal is transmitted.

3. The method according to the supplement 1 or 2, wherein temporally adjacent sounding reference signal resources are two sounding reference signal resources in the same sounding reference signal resource set;

or, temporally adjacent sounding reference signal resources are two sounding reference signal resources in different sounding reference signal resource sets.

4. The method according to any of the supplements 1 to 3, wherein in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

5. The method according to any of the supplements 1 to 4, wherein the number Y of symbols of the guard period is predefined, or is configured by the network device, or is predetermined by the terminal equipment.

6. The method according to any of the supplements 1 to 5, wherein sounding reference signal resource sets of the same type are able to be configured in different slots, or sounding reference signal resource sets of different types are able to be configured in the same slot.

7. The method according to any of the supplements 1 to 6, wherein the same sounding reference signal resource is able to be configured on symbols of different slots.

8. The method according to any of the supplements 1 to 6, wherein the method further includes:

the terminal equipment is configured to, in a case where the same sounding reference signal resource is configured on symbols of different slots, delay the sounding reference signal resource by one or more symbols, so that the sounding reference signal resource is located in the same slot.

9. The method according to any of the supplements 1 to 8, wherein the method further includes:

the terminal equipment is configured to, after transmitting the sounding reference signals, on one or more consecutive symbols immediately adjacent to a sounding reference signal resource of the sounding reference signal, transmit control information and/or data information by using an antenna identical to the antenna of the sounding reference signal resource.

10. The method according to any of the supplements 1 to 9, wherein the method further includes:

receiving, by the terminal equipment, downlink control information (DCI) transmitted by the network device; and transmitting, by the terminal equipment, the sounding reference signal to the network device by using the sounding reference signal resources according to triggering of the downlink control information.

11. The method according to any of the supplements 1 to 10, wherein the sounding reference signal is transmitted on any one or more symbols in a slot.

12. The method according to any of the supplements 1 to 11, wherein the guard period includes multiple symbols, the number of the symbols being different for different sub-carrier spacings.

13. The method according to any of the supplements 1 to 12, wherein the method further includes:

determining, by the terminal equipment, before one round of transmitting the sounding reference signal for antennas of the terminal equipment, whether an antenna used by a first sounding reference signal resource in the round is the same as an antenna used by a temporally adjacent resource preceding the first sounding reference signal resource;

when it is determined that the antennas are not the same antenna, setting the guard period between the first sounding reference signal resource and the resource; when it is determined that the antennas are the same antenna, setting no guard period between the first sounding reference signal resource and the resource.

14. The method according to any of the supplements 1 to 12, wherein the method further includes:

determining, by the terminal equipment, after one round of transmitting the sounding reference signal for antennas of the terminal equipment, whether an antenna used by a last sounding reference signal resource in the round is the same as an antenna used by a temporally adjacent resource following the last sounding reference signal resource;

when it is determined that the antennas are not the same antenna setting the guard period between the last sounding reference signal resource and the resource; when it is determined that the antennas are the same antenna, setting no guard period between the last sounding reference signal resource and the resource.

15. A method for receiving a sounding reference signal, including:

transmitting, by a network device, configuration information of one or more sounding reference signals (SRSs) used for antenna switching to a terminal equipment; and receiving, by the network device, the sounding reference signal (SRS) transmitted by the terminal equipment according to the configuration information by using one or more sounding reference signal (SRS) resources, wherein a guard period is configured between adjacent sounding reference signal (SRS) resources of transmitting the sounding reference signal for antennas of the terminal equipment.

16. The method according to the supplement 15, wherein the method further includes:

transmitting, by the network device, downlink control information to the terminal equipment, the downlink control information triggering the terminal equipment to transmit the sounding reference signal to the network device by using the sounding reference signal (SRS) resources.

17. The method according to the supplement 15 or 16, wherein the method further includes:

determining, by the network device, a transmission period of the sounding reference signal according to a time length of the sounding reference signal (SRS) resource and the guard period.

18. The method according to the supplement 17, wherein for the same sub-carrier spacing, in a case where a sum of the time length of the sounding reference signal (SRS) resource and the guard period is greater than N slots, the transmission period of the sounding reference signal is configured as N+1 by radio resource control (RRC) signaling; where, N is a positive integer.

19. The method according to the supplement 18, wherein N is greater than or equal to 1 and smaller than or equal to 2560.

20. The method according to any of the supplements 15 to 19, wherein the guard period includes multiple symbols, the number of the symbols being different for different sub-carrier spacings.

21. The method according to any of the supplements 5 to 20, wherein in a case where a sub-carrier spacing is 240 kHz, the guard period at least includes 4 symbols, in a case where a sub-carrier spacing is 480 kHz, the guard period at least includes 7 symbols, and in a case where a sub-carrier spacing is 960 kHz, the guard period at least includes 14 symbols.

22. A terminal equipment, including a memory and a processor, the memory storing a computer program, the processor being configured to execute the computer program to implement the method for transmitting a sounding reference signal according to any of the supplement 1 to 14.

23. A network device, including a memory and a processor, the memory storing a computer program, the processor being configured to execute the computer program to implement the method for receiving a sounding reference signal according to any of the supplements 15 to 21.

What is claimed is:

1. An apparatus for transmitting a sounding reference signal, which is configured in a terminal equipment, comprising:

a receiver configured to receive configuration information of one or more sounding reference signal resources; and a transmitter configured to transmit a sounding reference signal used for antenna switching according to the configuration information by using the one or more sounding reference signal resources, wherein a guard period is configured between sounding reference signal resources in one or more sounding reference signal resource sets, wherein at a sub-carrier spacing being 480 kHz, the guard period includes at least 7 symbols, and at the sub-carrier spacing being 960 kHz, the guard period includes at least 14 symbols.

2. The apparatus according to claim 1, wherein in one round for antenna switching performed for all antennas of the terminal equipment, the sounding reference signal is transmitted.

3. The apparatus according to claim 1, wherein sounding reference signal resources are two sounding reference signal resources in a same sounding reference signal resource set; or sounding reference signal resources are two sounding reference signal resources in different sounding reference signal resource sets.

4. The apparatus according to claim 1, wherein a number Y of symbols of the guard period is predefined, or is configured by a network device, or is predetermined by the terminal equipment.

5. The apparatus according to claim 1, wherein sounding reference signal resource sets of a same type are configurable in different slots, or sounding reference signal resource sets of different types are configurable in a same slot.

6. The apparatus according to claim 1, wherein a same sounding reference signal resource is configurable on symbols of different slots.

7. The apparatus according to claim 1, wherein the transmitter is further configured to, for a same sounding reference signal resource that is configured on symbols of different slots, delay the sounding reference signal resource by one or more symbols such that the sounding reference signal resource is located in a same slot.

8. The apparatus according to claim 1, wherein the transmitter is further configured to, after transmitting the sounding reference signal, on one or more consecutive symbols immediately adjacent to a sounding reference signal resource of the sounding reference signal, transmit control information and/or data information by using an antenna identical to an antenna of the sounding reference signal resource.

9. The apparatus according to claim 1, wherein the receiver further receives downlink control information transmitted by a network device; and the transmitter is further configured to transmit the sounding reference signal to the network device by using the one or more sounding reference signal resources according to triggering of the downlink control information.

10. The apparatus according to claim 1, wherein the sounding reference signal is transmitted on any one or more symbols in a slot.

11. The apparatus according to claim 1, wherein the guard period includes multiple symbols, the number of the symbols being different for different sub-carrier spacings.

12. The apparatus according to claim 1, wherein the apparatus further comprises:

processor circuitry configured to, before one round of transmitting the sounding reference signal for antennas of the terminal equipment, determine whether an antenna used by a first sounding reference signal resource in the round is the same as an antenna used by a resource preceding the first sounding reference signal resource; and in response to determining that the antenna used by the first sounding reference signal resource in the round and the antenna used by the resource preceding the first sounding reference signal resource are not same, set the guard period between the first sounding reference signal resource and the resource; and in response to determining that the antenna used by the first sounding reference signal resource in the round and the antenna used by the resource preceding the first sounding reference signal resource are same, set no guard period between the first sounding reference signal resource and the resource.

13. The apparatus according to claim 1, wherein the apparatus further comprises:

processor circuitry configured to, after one round of transmitting the sounding reference signal for antennas of the terminal equipment, determine whether an antenna used by a last sounding reference signal resource in the round is the same as an antenna used by a resource following the last sounding reference signal resource; and in response to determining that the antenna used by the last sounding reference signal resource in the round and the antenna used by the resource following the last sounding reference signal resource are not same, set the guard period between the last sounding reference signal resource and the resource; and in response to determining that the antenna used by the last sounding reference signal resource in the round and the antenna used by the resource following the last sounding reference signal resource are same, set no guard period between the last sounding reference signal resource and the resource.

14. An apparatus for receiving a sounding reference signal, which is configured in a network device, comprising:

a transmitter configured to transmit configuration information of one or more sounding reference signal resources to a terminal equipment; and a receiver configured to receive a sounding reference signal used for antenna switching transmitted by the terminal equipment according to the configuration information by using the one or more sounding reference signal resources, wherein a guard period is configured between sounding reference signal resources in one or more sounding reference signal resource sets, wherein at a sub-carrier spacing being 480 kHz, the guard period includes at least 7 symbols, and at the sub-carrier spacing being 960 kHz, the guard period includes at least 14 symbols.

15. The apparatus according to claim 14, wherein the transmitter is further configured to transmit downlink control information to the terminal equipment, the downlink control information triggering the terminal equipment to transmit the sounding reference signal to the network device by using the sounding reference signal resources.

16. The apparatus according to claim 14, wherein the apparatus further comprises:

processor circuitry configured to determine a transmission period of the sounding reference signal according to a time length of one of the one or more sounding reference signal resources that is used for transmitting the sounding reference signal and the guard period.

17. The apparatus according to claim 16, wherein for the same sub-carrier spacing, for a sum of the time length of the sounding reference signal resource and the guard period being greater than N slots, the transmission period of the sounding reference signal is configured as N+1 by radio resource control signaling; where, N is an integer greater than or equal to 1 and less than or equal to 2560.

18. A communication system, comprising:

a terminal equipment configured to receive configuration information of one or more sounding reference signal resources, and transmit a sounding reference signal used for antenna switching according to the configuration information by using the one or more sounding reference signal resources, wherein a guard period is configured between sounding reference signal resources in one or more sounding reference signal 5 resource sets, wherein at a sub-carrier spacing being 480 kHz, the guard period includes at least 7 symbols, and at the sub-carrier spacing being 960 kHz, the guard period includes at least 14 symbols; and a network device configured to transmit configuration 10 information of the one or more sounding reference signal resources to the terminal equipment, and receive the sounding reference signal used for antenna switching transmitted by the terminal equipment according to the configuration information by using the one or more 15 sounding reference signal resources.

\* \* \* \* \*